(12) United States Patent
Verhille et al.

(10) Patent No.: US 10,897,186 B2
(45) Date of Patent: Jan. 19, 2021

(54) TORQUE MOTOR INCLUDING A WINDING SUPPORT FOR STATOR WINDINGS AND METHOD FOR ASSEMBLING A TORQUE MOTOR OF THIS TYPE

(71) Applicant: LIEBHERR-AEROSPACE TOULOUSE SAS, Toulouse (FR)

(72) Inventors: Loïc Verhille, Monbequi (FR); François Ramadour, Castelnau d'Estretefonds (FR); Raphael Vilamot, Pechbonnieu (FR); Rémi Wojcieszonak, Lafitte Vigordane (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 435 days.

(21) Appl. No.: 16/038,148

(22) Filed: Jul. 17, 2018

(65) Prior Publication Data
US 2019/0020254 A1    Jan. 17, 2019

(30) Foreign Application Priority Data

Jul. 17, 2017   (FR) ...................................... 17 56764

(51) Int. Cl.
*H02K 21/26*      (2006.01)
*H02K 26/00*      (2006.01)
(Continued)

(52) U.S. Cl.
CPC ............. *H02K 26/00* (2013.01); *H02K 1/146* (2013.01); *H02K 1/16* (2013.01); *H02K 1/17* (2013.01);
(Continued)

(58) Field of Classification Search
CPC .......... H02K 1/146; H02K 26/00; H02K 1/16; H02K 1/17; H02K 3/30; H02K 3/48;
(Continued)

(56) References Cited

U.S. PATENT DOCUMENTS 5,821,661 A    10/1998  Wissmach et al.
5,825,112 A *  10/1998  Lipo .................... H02K 19/103
                                                         310/181
(Continued)

FOREIGN PATENT DOCUMENTS

DE      4101666     11/1991
JP     2011109785    6/2011

*Primary Examiner* — Thanh Lam
(74) *Attorney, Agent, or Firm* — Steven M. Greenberg, Esq.; Shutts & Bowen LLP

(57) ABSTRACT

The invention relates to a torque motor comprising a stator and a rotor that extend along a common central axis. The stator includes an integral magnetic body and at least one pair of radial teeth that extend along the central axis and define slots for receiving stator windings, and at least one permanent magnet supported by the integral magnetic body. The torque motor also includes a winding support for the stator windings that has a hollow body that extends along the central axis and that delimits a chamber for receiving the rotor, and cavities for receiving the stator windings. In this way, the stator windings are integrated in the stator by the winding support, fitted with the stator windings, being axially inserted into the integral magnetic body.

13 Claims, 3 Drawing Sheets

(51) Int. Cl.
  *H02K 1/17* (2006.01)
  *H02K 3/30* (2006.01)
  *H02K 3/48* (2006.01)
  *H02K 15/03* (2006.01)
  *H02K 1/16* (2006.01)
  *H02K 5/16* (2006.01)
  *H02K 1/14* (2006.01)
  *H02K 15/04* (2006.01)
  *H02K 3/52* (2006.01)

(52) U.S. Cl.
  CPC .............. *H02K 3/30* (2013.01); *H02K 3/48* (2013.01); *H02K 5/16* (2013.01); *H02K 15/03* (2013.01); *H02K 3/522* (2013.01); *H02K 15/0442* (2013.01); *H02K 2203/12* (2013.01)

(58) Field of Classification Search
  CPC .......... H02K 5/16; H02K 15/03; H02K 3/522; H02K 15/0442; H02K 2203/12; Y10T 29/53143; Y10T 29/49009; Y10T 29/49012; Y10T 29/49071; Y10T 29/49073; Y10T 29/49075
  USPC ......... 310/154.04–154.03, 181; 29/596, 598, 29/605, 606
  See application file for complete search history.

(56) References Cited

U.S. PATENT DOCUMENTS

| | | | | |
|---|---|---|---|---|
| 6,342,746 | B1* | 1/2002 | Flynn | H02K 1/12 |
| | | | | 310/181 |
| 7,146,706 | B2* | 12/2006 | Du | H02K 1/148 |
| | | | | 29/596 |
| 7,868,505 | B2* | 1/2011 | Yamashita | H02K 21/44 |
| | | | | 310/181 |
| 2002/0084714 | A1* | 7/2002 | Fujita | H02K 23/04 |
| | | | | 310/181 |
| 2005/0218749 | A1 | 10/2005 | Shin et al. | |

* cited by examiner

TORQUE MOTOR INCLUDING A WINDING SUPPORT FOR STATOR WINDINGS AND METHOD FOR ASSEMBLING A TORQUE MOTOR OF THIS TYPE

CROSS-REFERENCE TO RELATED APPLICATIONS

This application claims priority under 35 U.S.C. 119(a) to French Patent Application No. 1756764, filed Jul. 17, 2017.

BACKGROUND OF THE INVENTION

Field of the Invention

The invention relates to a torque motor, in particular to a torque motor for aeronautical applications that has a limited range of movement.

Description of the Related Art

Torque motors are electric motors of which the purpose is to achieve a torque by means of the flow of an electric current that has a specified intensity in windings located in a permanent magnetic field. A torque motor includes an armature, which is the part of the motor that supports the windings through which the current passes, and an inductor, which is the complementary part of the motor that generates the permanent magnetic field. In general, the permanent magnetic field is generated by permanent magnets arranged on the rotor or on the stator of the motor.

Torque motors are often used in the field of aeronautics, for example for being fitted in pneumatic actuators for bleed-air valves, cabin-pressure regulating valves, fuel-flow regulating systems, etc. These aeronautical uses impose a plurality of restrictions on torque motors, in particular in terms of mass, volume, temperature, vibration behaviour, etc. Furthermore, the preferred structure often includes an integral stator that supports at least one permanent magnet, stator windings and a rotor that forms the armature. This structure produces motors that are compact and minimise the inertia of the rotor.

This structure imposes some restrictions during the manufacture of the motor, including the need to integrate the permanent magnets very early in the manufacturing process, and in particular before the winding procedures; producing the electric stator windings on specific tools; insulating the windings before they are integrated in the motor; and integrating the stator windings produced in this way in the integral stator magnetic circuit by means of intricate procedures that entail radially moving the windings onto the magnetic circuit (via the interior or the exterior of the magnetic circuit, which for some applications involves manually shaping the stator windings and compacting them so as to make it possible to house them in the integral stator).

This manufacturing process is long, tedious and expensive. It also incurs the risk of poor electrical insulation as a result of the stator windings being handled while being integrated in the stator magnetic circuit. Moreover, it is often necessary in the course of operations for assembling the torque motors to discard a significant number of produced parts that result from the stator windings being damaged while being integrated in the stator circuit. This manufacturing method also prevents the use of ceramic-coated wire.

BRIEF SUMMARY OF THE INVENTION

The inventors have therefore sought to improve torque motors, in particular torque motors intended for aeronautical applications. The inventors have specifically sought to propose a new torque motor structure that allows the procedures for assembling the torque motor to be facilitated. In this regard, the invention aims to provide a torque motor that overcomes at least some of the disadvantages of known torque motors.

The invention aims in particular to provide, in at least one embodiment, a torque motor that has a structure which allows the assembly and manufacturing operations to be simplified. The invention aims in particular to provide, in at least one embodiment, a torque motor that has a structure which allows the number of torque motors discarded during assembly operations to be limited. The invention also aims to provide, in at least one embodiment, a torque motor that has improved electrical insulation performance compared with previous solutions. The invention also aims to provide, in at least one embodiment, a torque motor that has a structure which allows the manufacturing and assembly time and costs to be substantially reduced.

The invention also aims to provide a torque motor that has a structure which can be specifically adapted to manufacturing automation, i.e. manufacturing in which manual procedures are reduced or even absent. The invention also aims to provide, in at least one embodiment, a torque motor that has a structure which can be adapted to use in a frameless mode. The invention also aims to provide a torque motor that has a structure which allows the radial distance between the stator teeth and the rotor teeth, which forms the air gap of the motor, to be reduced at a low cost.

For this purpose, the invention relates to a torque motor including a stator and a rotor that extend along a common central axis, the stator also including an integral magnetic body and at least one pair of radial teeth that extend along the central axis, define slots for receiving stator windings and form a radial air gap together with the rotor, and at least one permanent magnet supported by the magnetic body.

A torque motor according to the invention is characterised in that it includes a winding support for stator windings which has a hollow body that extends along the central axis and delimits a chamber for receiving the rotor, the support also including cavities for receiving the stator windings, which cavities extend in planes in parallel with the central axis and include radial peripheral walls that are shaped to the slots for the integral magnetic body such that the stator windings are integrated in the stator by the winding support, fitted with the stator windings, being axially inserted into the integral magnetic body.

A torque motor according to the invention therefore includes a winding support for stator windings. The winding support is shaped to the integral stator magnetic body such that, after the windings have been mounted in the cavities for receiving the winding support, it is possible to simply axially slide the winding support into the integral magnetic circuit during the assembly operations. Axially inserting the winding support into the slots for receiving the integral magnetic body ensures that the stator windings are placed around the radial teeth. In other words, according to the invention, the stator windings are first mounted on the winding support in the winding-receiving cavities, then integrated in the slots that are formed between the radial teeth by positioning the winding support in the slots thus formed for the integral magnetic body of the stator. In contrast with previous solutions, the structure of the torque motor according to the invention is not designed for radial integration of the stator windings around the radial teeth, but for axial integration by means of an additional part, namely the winding support. Rather than complicating the manufacturing and assembly operations, this additional part facilitates the assembly operations by allowing the windings to be inserted axially after the windings have been mounted on the winding support.

Furthermore, the winding support is hollow and delimits a chamber for receiving the rotor, such that it is easy to assemble a torque motor according to the invention by axially inserting the rotor into the receiving chamber, in which the rotor can be placed after the winding support, fitted with the stator windings, has been axially inserted into the magnetic body of the stator, or before the winding support, fitted with the stator windings, has been axially inserted into the magnetic body of the stator.

Advantageously and according to the invention, the winding support is electrically insulating, at least in the cavities for receiving the stator windings. According to this advantageous variant, the additional part (the winding support) provides electrical insulation between the magnetic circuit and the stator windings. The cavities for receiving the windings include radial peripheral walls that are shaped to the slots in the stator such that the windings are perfectly electrically insulated from the magnetic circuit, while limiting the space required as far as possible, after the winding support has been inserted into the integral stator.

Advantageously and according to the invention, the winding support for the stator windings is non-magnetic. A support according to this variant makes it possible not to disturb the magnetic field generated by the windings and the magnets in the air gap, i.e. in the space formed between the teeth of the stator and the rotor. In other words, this additional part not only allows operations for assembling a torque motor to be facilitated by means of axial insertion of the stator windings, but also allows the performance of the motor to be improved.

Advantageously and according to the invention, the winding support is formed in a single piece. This variant makes it possible to provide an integral winding support that can be inserted into the magnetic circuit by a single movement. According to other variants, the support can be formed by multiple parts, for example one part for each winding-receiving cavity, which parts are interconnected before being axially inserted into the magnetic circuit. According to another variant, the various parts are separately axially inserted into the magnetic circuit.

Advantageously and according to the invention, the winding support is made of ceramic. This advantageous variant allows the torque motors to be used in extreme-temperature environments.

Advantageously and according to the invention, the stator windings are made of wires coated with an insulator that is fragile, i.e. particularly vulnerable to damage when being shaped (plasticity). Examples of the insulators include insulators of mineral origin, such as ceramic. Windings made of ceramic-insulator-coated wires cannot be used in torque motors from the prior art that do not have a winding support, because such windings are fragile and there is a risk of damaging the windings when the windings are being handled in order to be radially inserted. In contrast, windings made of ceramic-insulator-coated wires can be used in a torque motor according to this variant of the invention, which opens up new applications for the torque motor, in particular in terms of temperature resistance.

Advantageously and according to the invention, the stator includes two permanent magnets arranged opposite one another and one pair of radial teeth that define two slots for receiving two stator windings, and the non-magnetic support includes two cavities for receiving the stator windings. This advantageous variant provides a torque motor that has a low manufacturing cost while performing so as to be compatible with various aeronautical applications, specifically for systems for controlling pneumatic actuators for bleed-air valves or cabin-pressure regulating valves.

Advantageously and according to the invention, the winding support supports bearings of the rotor. This advantageous variant provides the winding support not only with a support function for the windings, facilitating the axial insertion of the windings into the magnetic circuit, but also with a mechanical function for supporting the rotational guide elements and axial stop elements of the rotor.

As a variant or in combination, the support includes stops that extend radially and form angular stops of the rotor. This variant provides the winding support with an additional function, namely limiting the angular movement of the rotor in the rotor-receiving chamber by means of radial stops that project into the receiving chamber.

Advantageously and according to the invention, the winding support for the stator windings also includes a peripheral compartment for connecting the stator windings to a power-supply wire of the torque motor. The peripheral compartment makes it possible to facilitate operations for electrically connecting an external power-supply wire and the stator windings. If the winding support is insulating, the connection compartment also ensures electrical insulation as a result of the features of the winding support.

Advantageously and according to the invention, the winding support for the stator windings also includes at least one slot designed for guiding and retaining at least one power-supply wire of the torque motor. The guide slots can, for example, be arranged in a base of the winding support for guiding the power-supply wire towards the electrical connection compartment, for example.

The invention also relates to a method for assembling a torque motor including a stator and a rotor that extend along a common central axis, the stator also including an integral magnetic body and at least one pair of radial teeth that extend along the central axis, define receiving slots for stator windings and form a radial air gap together with the rotor, at least one permanent magnet supported by the integral magnetic body, a winding support for the stator windings including a hollow body extending along the central axis and delimiting a chamber for receiving the rotor, the support also including cavities for receiving the stator windings that extend in planes in parallel with the central axis and include peripheral radial walls that are shaped to the slots for receiving the integral magnetic body.

A method according to the invention is characterised in that it includes the following steps:
  mounting the stator windings on the winding support,
  axially inserting the winding support, fitted with the stator windings, into the integral magnetic body of the stator,
  axially inserting the rotor into the hollow body of the winding support.

An assembly method according to the invention therefore allows a motor according to the invention to be assembled by first mounting the stator windings on the winding support, then axially inserting the winding support, fitted with the windings, into the stator of the motor. The rotor can be inserted either at the same time as the winding support is inserted, or afterwards.

According to an advantageous variant of the assembly method, the windings are impregnated after being mounted on the winding support for the windings. The windings can be mounted on the winding support either by holding the winding support in a fixed position and rotating a winding wire in the cavities for receiving the winding support, or by holding the winding wire in a fixed position and rotating the winding support around the winding wire.

The invention relates to both a torque motor and to a method for assembling a torque motor, characterised in combination by all or some of the features mentioned above or below.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figures 1, 2:
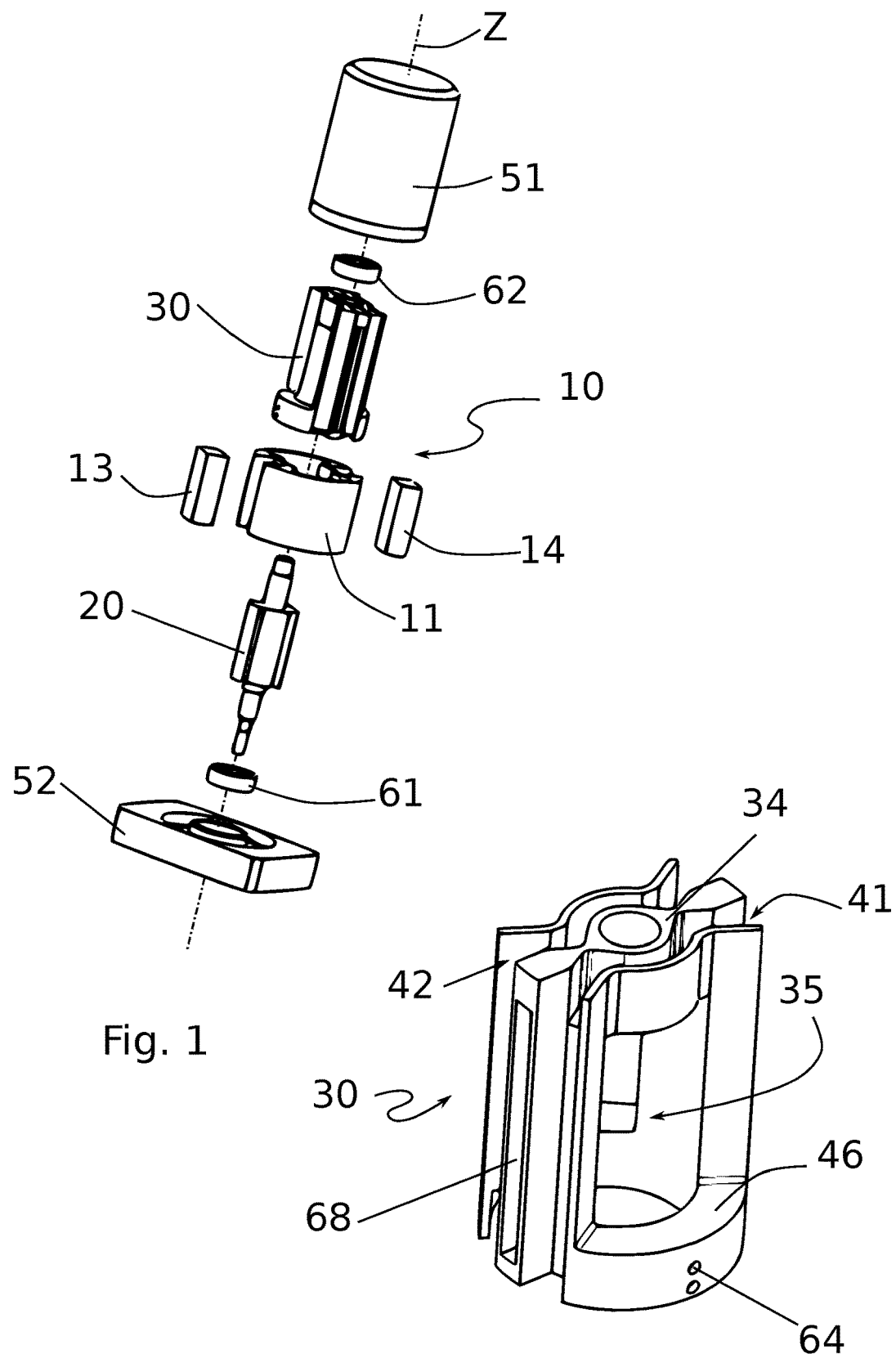
FIG. 1 is an exploded schematic perspective view of a torque motor according to an embodiment of the invention.
FIG. 2 is a schematic perspective view of a winding support of a torque motor according to an embodiment of the invention.

Scales and proportions have not been strictly adhered in the drawings for the purposes of illustration and clarity. Throughout the following detailed description with reference to the drawings, every element of the motor is described as it is arranged when the torque motor is assembled, unless otherwise specified. Moreover, identical, similar or equivalent elements are denoted by the same reference signs in all the figures. The terms "axial" and "radial" are used in a non-limiting manner and refer to the main axis Z along which the torque motor extends, as is shown in FIG. 1 specifically. Finally, for any given element, the terms "internal" and "external" or "peripheral" are used to denote the parts of the element that are adjacent to the main axis Z and the parts of the element that are remote from the main axis Z, respectively.

As shown in FIG. 1, a torque motor according to the invention includes a stator 10 and a rotor 20 that extend along a common central axis Z.

Figure 4:
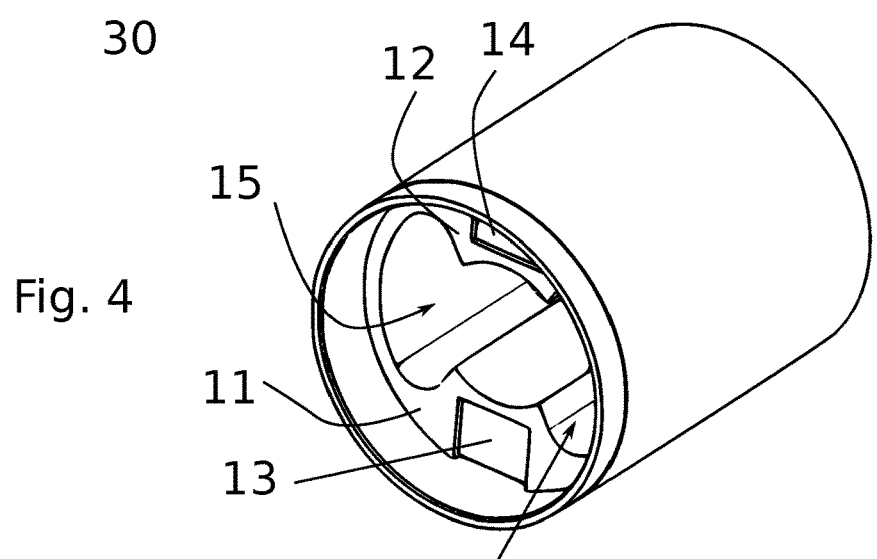
FIG. 4 is a schematic perspective view of a stator of a torque motor according to an embodiment of the invention.

The stator 10 according to the embodiment shown in the drawings includes, as is shown in particular in FIG. 4, an integral magnetic body 11, a pair of radial teeth 12 that extend along the central axis Z and define, therebetween, two slots 15, 16 for receiving stator windings, and two permanent magnets 13, 14 that are laterally supported by the integral magnetic body 11.

The torque motor according to the invention also includes a winding support 30 for stator windings 32, 33 which has a hollow body 34 that extends along the central axis Z.

According to the embodiment shown in the drawings, the support 30 is formed in a single piece. However, according to other embodiments, the support 30 can be formed in one or more pieces interconnected by connection means.

According to the embodiment shown in the drawings, the hollow body 34 defines, in the centre thereof, a chamber 35 for receiving the rotor 20. The chamber 35 opens at each axial end of the hollow body 34 such that the rotor 20 can be housed in the chamber through an axial end of the hollow body during the operations for assembling the torque motor.

As is shown in FIG. 2, the support 30 includes cavities 41, 42 for receiving the stator windings 32, 33. The windings 32, 33 extend in planes that are in parallel with the central axis Z.

Figure 5:
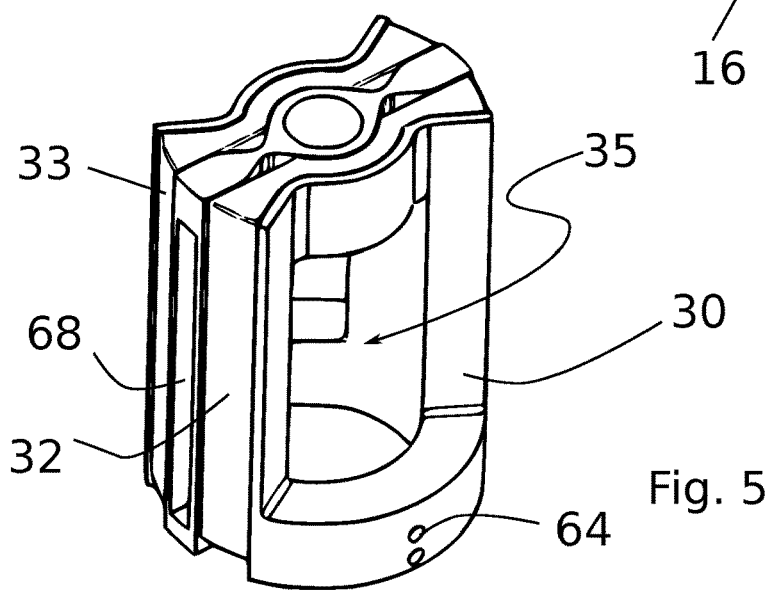
FIG. 5 is a schematic perspective view of a winding support, fitted with stator windings, of a torque motor according to an embodiment of the invention.

FIG. 2 shows the support 30 without the stator windings 32, 33, and FIG. 5 shows the support 30 fitted with the stator windings 32, 33.

After the support 30 has been fitted with the stator windings 32, 33, the support is shaped to the slots 15, 16 for receiving the magnetic body 11 of the stator, which are formed between the radial teeth of the magnetic body 11 of the stator.

The stator windings 32, 33 are thus integrated in the stator 10 by axially inserting the support 30, fitted with the stator windings 32, 33, into the integral magnetic body 11 of the stator.

The various steps executed during a method for assembling a torque motor according to the invention are schematically represented by FIGS. 3a to 3d, in which the integral magnetic body 11 has already been inserted into a housing 51.

Figure 3A:
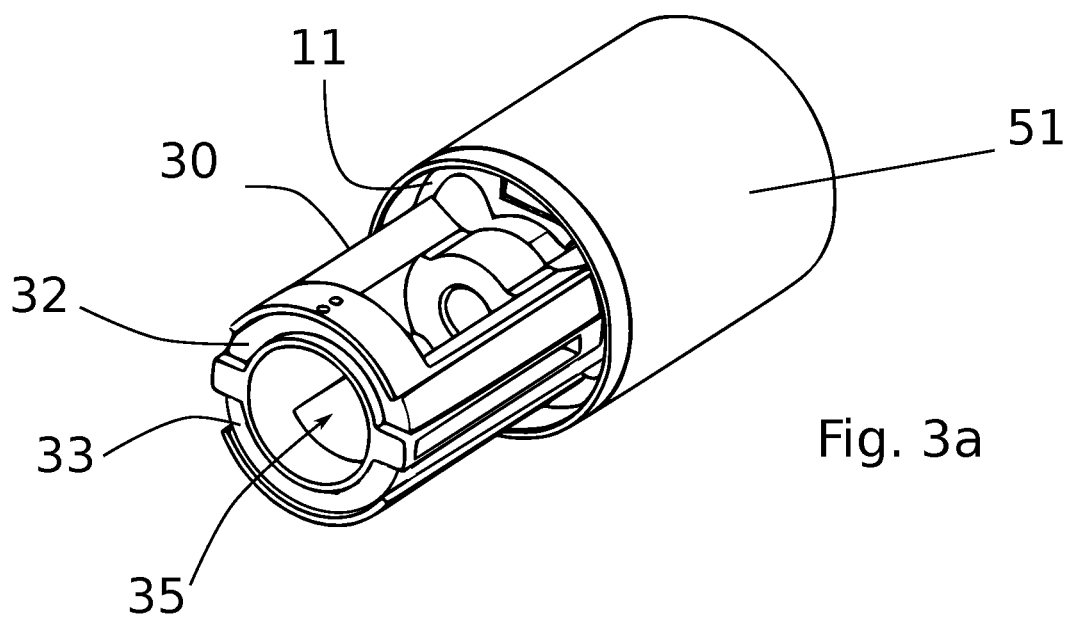
FIGS. 3a to 3d are schematic perspective views of the various steps of axially inserting a winding support into a stator of a torque motor according to an embodiment of the invention.

In FIG. 3a, the winding support 30 fitted with the stator windings 32, 33 is entering the integral magnetic body 11.

Figure 3B:
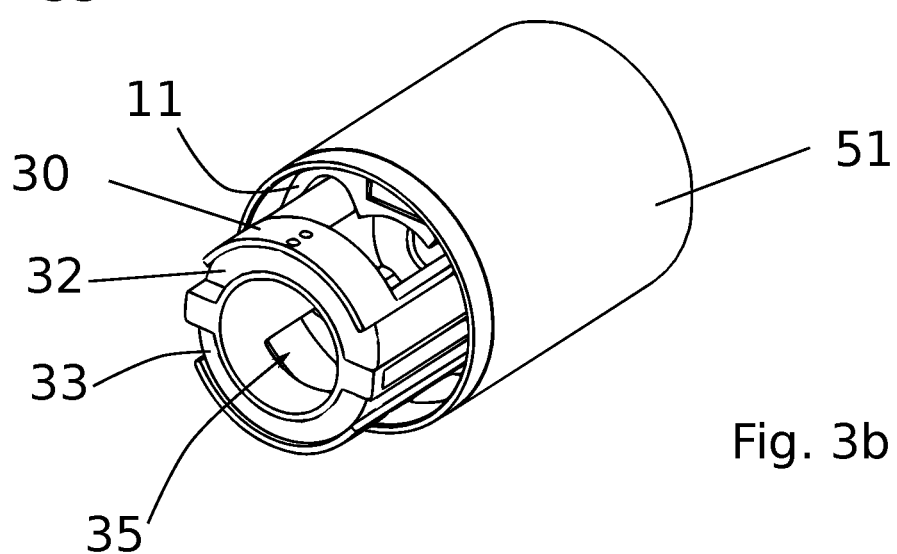

In FIG. 3b, the winding support 30 is partially inserted into the integral magnetic body 11.

Figure 3C:
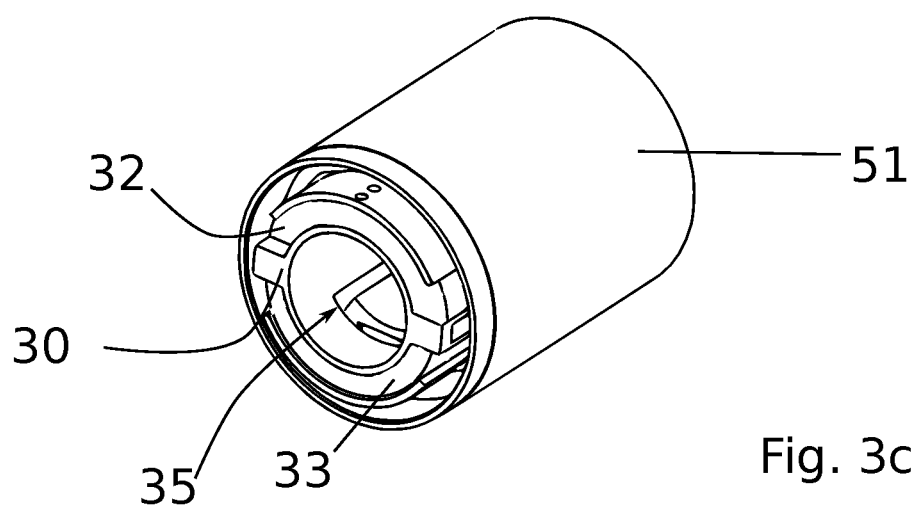

In FIG. 3c, the winding support is completely inserted into the integral magnetic body 11. The stator windings 32, 33 are thus in position between the radial teeth of the stator. The stator windings 32, 33 were put in position merely by axially moving the winding support.

Figure 3D:
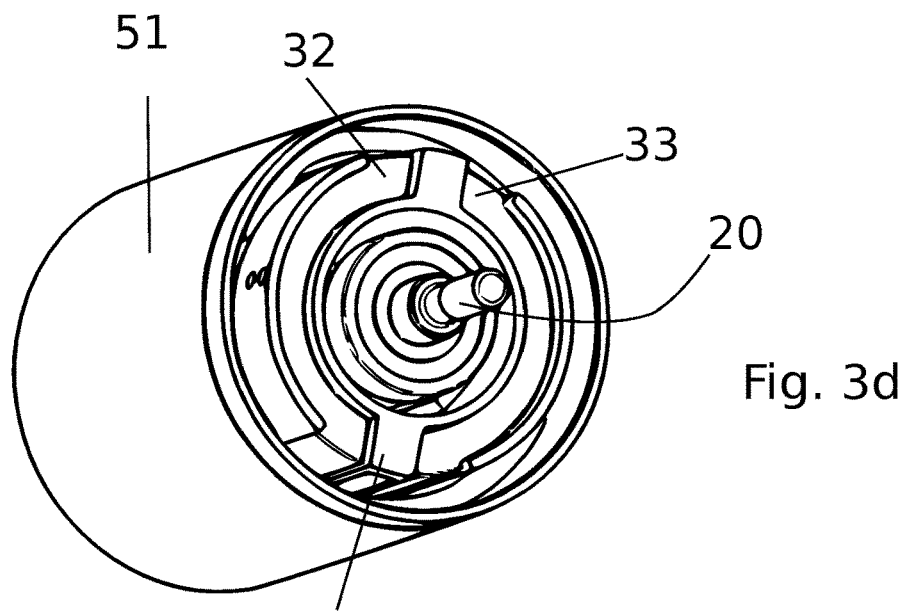

In FIG. 3d, the rotor 20 has been axially inserted into the chamber 35 of the winding support 30. The final assembly step (not shown in the drawings) entails equipping the motor with a power-supply wire and screwing a base 52 to the housing 51 of the motor.

Assembly of a torque motor according to the invention is therefore simplified by allowing the stator windings 32, 33 to be mounted on the support 30, and then allowing the support fitted with the windings to be inserted into the stator. The stator windings 32, 33 can be mounted in the receiving cavities 41, 42 by implementing an automated assembly line, which simplifies and accelerates the assembly operations in comparison with manual procedures. The operations for axially inserting the winding support into the integral magnetic body of the stator and for axially inserting the rotor can similarly be automated.

Furthermore, since the winding support fitted with the windings is shaped to the slots 15, 16 of the stator, the dielectric performance of the torque motor according to the invention is improved in comparison with torque motors from the prior art.

Using a winding support also makes it possible to minimise the radial distance that separates the teeth of the stator and the teeth of the rotor and forms the air gap of the motor. The optimised air gap allows a torque motor to be provided which has improved electromechanical performance in comparison with previous solutions.

The winding support is preferably non-magnetic and electrically insulating. The support is made of ceramic, for example.

A ceramic support of this type makes it possible not to disturb the magnetic field generated by the windings and the magnets in the air gap of the motor, which aids in improving the performance of a torque motor according to this embodiment.

According to an embodiment of the invention, the stator windings 32, 33 are made of wires coated with a ceramic insulator. According to an advantageous embodiment, a torque motor can include wires coated with a ceramic material, since the torque motor according to the invention no longer carries the risk of the windings being damaged by complex handling procedures for inserting the windings into the stator.

This allows the torque motor according to this embodiment of the invention to be used in motor environments (which can reach temperatures of approximately 450° C.) without the need to add ventilation means specific to the torque motor.

The torque motor according to the embodiment shown in the drawings also includes a housing 51 and a base 52. The housing 51 and the base 52 are designed so that they can be rigidly interconnected such that they surround the various elements of the torque motor. For this purpose, according to an embodiment not shown in the drawings, the housing 51 can include radial tabs in which through-openings for screw elements are made opposite corresponding openings in the base 52. Of course, the housing 51 and the base 52 can be connected by other connection means without changing the object of the invention. These can be threads arranged on the peripheral wall of the housing 51 that correspond to threads arranged on the base 52, snap-coupling means, or any other similar means.

The torque motor also includes bearings 61, 62 of the rotor. According to an embodiment of the invention, the bearings 61, 62 are directly supported by the winding support 30, which limits the number of parts in the torque motor and facilitates the assembly thereof.

As shown in FIGS. 2 and 5, the winding support for the stator windings also includes a peripheral compartment 68 for connecting the stator windings to a power-supply wire of the torque motor.

According to the embodiment shown in the drawings, the peripheral compartment 68 is formed in a lateral flank of the winding support which extends along the central axis between the cavities 41, 42 for receiving the stator windings. The compartment 68 has at least one first opening designed for receiving a power-supply wire of the torque motor, and a second opening designed for receiving an end of the wires of the stator windings. The second opening, intended to receive the wire of the stator windings, is formed on an internal wall of the compartment, for example, and the first opening is formed on an external wall of the compartment, for example. According to an embodiment, the peripheral compartment 68 is designed for receiving an electrical power-supply connector that is shaped to a winding connector designed for receiving an end of the wires of the stator windings, such that inserting the power-supply connector into the compartment automatically ensures electrical connection to the wires of the stator windings that are joined to the winding connector.

As shown in FIGS. 2 and 5, the winding support also includes two openings 64 that are made adjacently to one another in the peripheral wall of the winding support and form means for guiding and retaining a power-supply wire of the torque motor. According to another variant, the means for guiding and retaining the power-supply wire are formed by a slot made in the base of the winding support.

A torque motor according to the embodiment shown in the drawings makes it possible both to facilitate motor assembly operations and to improve the dielectric strength features.

The invention is not limited only to the embodiment shown in the drawings. In particular, the winding support can be in different forms provided that it is shaped to the integral stator so that the winding support, fitted with stator windings, can be inserted axially.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description; but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

What is claimed is:

1. A torque motor comprising:
a stator and a rotor that extend along a common central axis, and
said stator comprising an integral magnetic body, at least one pair of radial teeth that extend along the central axis, define slots for receiving stator windings and form a radial air gap together with said rotor, and at least one permanent magnet supported by said integral magnetic body,
wherein said torque motor also comprises a winding support for stator windings which has a hollow body that extends along the central axis and delimits a chamber for receiving said rotor, wherein said winding support comprises cavities for receiving said stator windings, and which cavities extend in planes in parallel with the central axis and comprise radial peripheral walls that are shaped to said slots for receiving said integral magnetic body such that the stator windings are integrated in said stator by said winding support, fitted with said stator windings, being axially inserted into said integral magnetic body.

2. The torque motor according to claim 1, wherein said winding support is formed in a single piece.

3. The torque motor according to claim 1, wherein said winding support is electrically insulating, at least in the cavities for receiving the stator windings.

4. The torque motor according to claim 1, wherein said winding support is non-magnetic.

5. The torque motor according to claim 1, wherein said winding support is made of a ceramic material.

6. The torque motor according to claim 1, wherein said stator comprises two permanent magnets arranged opposite one another, and one pair of radial teeth that define two slots for receiving two stator windings, and wherein said support comprises two cavities for receiving said stator windings.

7. The torque motor according to claim 1, wherein said stator windings are made of wires coated in an insulator of mineral origin.

8. The torque motor according to claim 7, wherein the insulator of mineral original is a ceramic.

9. The torque motor according to claim 1, wherein said support supports bearings of said rotor.

10. The torque motor according to claim 1, wherein said support comprises stops that extend radially and form angular stops of the rotor.

11. The torque motor according to claim 1, wherein said support also comprises a peripheral compartment connecting the stator windings to a power-supply wire of said torque motor.

12. The torque motor according to claim 1, wherein said support further comprises a guide slot guiding and retaining at least one power-supply wire of said torque motor.

13. A method for assembling a torque motor comprising a stator and a rotor that extend along a common central axis, said stator comprising an integral magnetic body and at least one pair of radial teeth that extend along the central axis, define slots for receiving stator windings and form a radial air gap together with said rotor, at least one permanent magnet supported by said integral magnetic body, a winding support for the stator windings which comprises a hollow body that extends along the central axis and delimits a chamber for receiving said rotor, said winding support comprising cavities for receiving said stator windings, which cavities extend in planes in parallel with the central axis and comprise radial peripheral walls that are shaped to said slots for receiving said integral magnetic body, the method comprising:

mounting the stator windings on the winding support, axially inserting the winding support, fitted with the stator windings, into the integral magnetic body of the stator, and axially inserting the rotor into the hollow body of the winding support.

\* \* \* \* \*